G. RASMESEN, Jr.
PAINTER'S AND DECORATOR'S SCRAPER.
APPLICATION FILED MAR. 2, 1910.
1,011,489.
Patented Dec. 12, 1911.
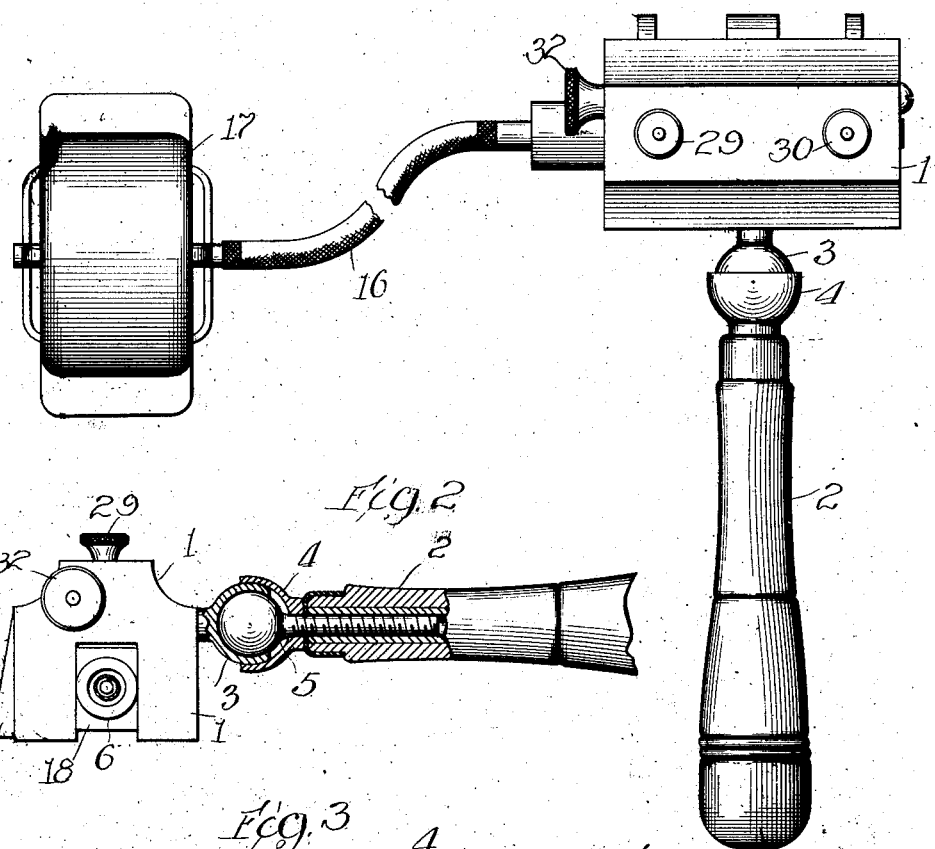
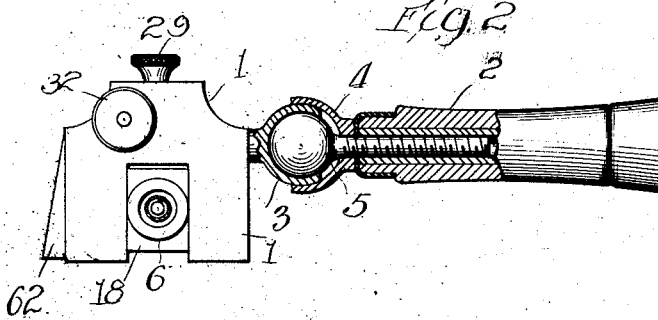
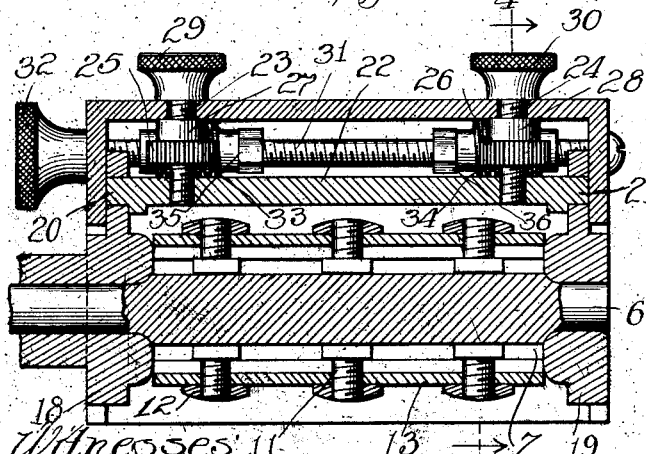
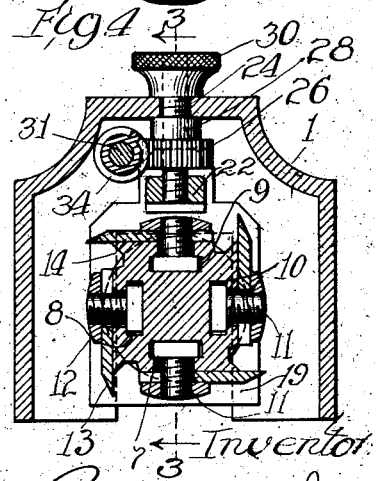
Witnesses
R. A. White
H. C. L. White
Inventor
George Rasmesen, Jr.
By Rummler & Rummler, Attys

UNITED STATES PATENT OFFICE.

GEORGE RASMESEN, JR., OF WINNETKA, ILLINOIS.

PAINTER'S AND DECORATOR'S SCRAPER.

1,011,489.　　　　　Specification of Letters Patent.　　Patented Dec. 12, 1911.

Application filed March 2, 1910. Serial No. 546,961.

*To all whom it may concern:*

Be it known that I, GEORGE RASMESEN, Jr., a citizen of the United States of America, and a resident of Winnetka, county of Cook, State of Illinois, have invented certain new and useful Improvements in Painters' and Decorators' Scrapers, of which the following is a specification.

The main objects of the present invention are to provide an improved tool for the use of decorators in removing paint, paper and the like from surfaces to be painted or decorated and to provide an improved construction for devices of this kind which will allow the working parts to be readily removed as a unit from the containing casing, and in which the structure of the parts is such that they are held in their operative relation by the casing and will readily slip apart when removed therefrom.

A specific embodiment of this invention is illustrated in the accompanying drawings, in which—

Figure 1 is a plan of the implement complete with a flexible driving shaft and a driving motor. Fig. 2 is an end elevation of the casing of the implement, showing parts of the adjustable handle in section. Fig. 3 is a longitudinal section through the center of the casing or frame. Fig. 4 is a transverse section on the lines 4—4 of Fig. 3.

In the construction shown, the implement comprises a casing or frame 1, adjustably connected to a handle 2 by means of a cylindrical shell 3 integral with the frame and fitting in a cup 4, carried by the handle. A round headed bolt 5 is inclosed by the shell and screw-threaded within the handle. It will be seen that by twisting the handle, it is possible to release the pressure between the shell 3 and the cup 4, thus allowing the frame to swing into any desired angle with respect to the handle.

Within the casing 1 and mounted to rotate therein, is an element comprising a shaft 6 having a hub integral therewith and provided with slots 7, 8, 9 and 10, within which are fitted the square heads of a plurality of bolts 11, equipped with nuts 12 and serving as clamps for a plurality of knives 13. The hub has flattened surfaces for the reception of these knives, and may have projecting shoulders 14 for the support of the forward or cutting edge of each knife. This rotary cutting implement is adjustably mounted within the frame so that it can be raised or lowered with respect to the front or open end of the frame, and may be rotated by means of a flexible shaft 16 connected to a suitable source of energy as an electric motor 17.

The adjusting means, whereby the cutting implement can be raised or lowered, comprises cross heads 18 and 19, slidingly mounted in guideways at the ends of the frame, and having rectangular recesses within which fit the squared ends 20 and 21 of a yoke or cross bar 22. This yoke is carried by lifting screws 23 and 24, carrying respectively the gears 25 and 26 and lock nuts 27 and 28. These nuts hold the gears in fixed position on the screws. The upper ends of the screws pass freely through the top of the case or frame and may be in threaded engagement with knurled set nuts 29 and 30.

Journaled transversely through the casing is a threaded shaft 31 having a knurled hand nut 32 at the end of the casing, whereby it may be turned. This shaft carries a pair of worm gears 33 and 34, held respectively by lock nuts 35 and 36 and adjusted for engagement with the gears 25 and 26.

The adjusting operation whereby the cutting implement can be raised or lowered is effected as follows: Set nuts 29 and 30 are loosened to allow shafts 23 and 24 some freedom of movement and then the head 32 is turned to make the worms 33 and 34 drive the gears 25 and 26, turning the shafts 23 and 24 in the yoke 22, and raising or lowering the cross heads and the cutting implement journaled therein. After the desired adjustment has been effected, set nuts 29 and 30 can be tightened to lock all the several parts in fixed position. The adjustment just described contemplates a movement up or down without changing the angle of the cutter with respect to the front of the frame or casing. If, for any reason, the cutter must be shifted with respect to the frame, as for instance, when the device is first assembled, one of the worms on shaft 31 can be released by its set nut and then turned sufficiently to raise or lower the adjacent end of the yoke, after which, the set nut can be tightened to lock the parts together again.

The yoke 22, cross-heads 18 and 19, and the rotary operating tool are removable from the casing as a unit by merely unscrewing the adjusting screws from the yoke, and as soon as these parts are slipped from the casing, they may be freely slipped apart. This construction is of great convenience in a device of this kind, where, on account of the nature of the surfaces operated upon, it is frequently necessary to clean the device to remove accumulations from the spaces in the interior thereof.

Although but one specific embodiment of this invention is herein shown, it will be understood that numerous details of the construction shown may be altered or omitted without departing from the spirit of this invention.

I claim:

In a decorator's tool, the combination of a casing open at one side, cross-heads mounted therein and slidable toward and away from said open side, a rotary surfacing element having its ends respectively journaled in said cross-heads, a yoke connecting said cross-heads, adjusting means connected with said yoke for adjusting said surfacing element, said casing being formed to inclose and secure all of said parts in operative relation, and said surfacing element and cross-heads being adapted to be readily slipped apart when said yoke is released from said adjusting means.

Signed at Winnetka, Ill., this tenth day of February 1910.

GEORGE RASMESEN, Jr.

Witnesses:
MAX K. WAGNER,
GEORGE C. HOGE.